United States Patent
Le Van Gong

(10) Patent No.: US 9,282,160 B2
(45) Date of Patent: Mar. 8, 2016

(54) METHOD, APPARATUS, AND COMPUTER READABLE MEDIUM FOR FLEXIBLE CACHING OF RESOURCE ORIENTED WEB SERVICES

(71) Applicant: NEUSTAR, INC., Mclean, VA (US)

(72) Inventor: Hubert Andre Le Van Gong, San Jose, CA (US)

(73) Assignee: Neustar, Inc., Sterling, VA (US)

( * ) Notice: Subject to any disclaimer, the term of this patent is extended or adjusted under 35 U.S.C. 154(b) by 98 days.

(21) Appl. No.: 13/942,266

(22) Filed: Jul. 15, 2013

(65) Prior Publication Data

US 2015/0019674 A1 Jan. 15, 2015

(51) Int. Cl.
*G06F 15/167* (2006.01)
*H04L 29/08* (2006.01)

(52) U.S. Cl.
CPC .................. *H04L 67/2852* (2013.01)

(58) Field of Classification Search
USPC .......................................... 709/200, 213, 223
See application file for complete search history.

(56) References Cited

U.S. PATENT DOCUMENTS

| 8,868,506 | B1 * | 10/2014 | Bhargava et al. | 707/648 |
| 2008/0163187 | A1 * | 7/2008 | Loff | 717/168 |
| 2015/0055557 | A1 * | 2/2015 | Dong et al. | 370/328 |

\* cited by examiner

*Primary Examiner* — El Hadji Sall
(74) *Attorney, Agent, or Firm* — Mahamedi Paradice LLP

(57) ABSTRACT

A cache management apparatus, method, and computer readable medium which manages caching of resources. The method includes analyzing a structure of a resource in a system which exposes resources to clients, generating a dependency graph of objects linked to a resource based on the analyzed structure of the resource, and managing caching of resources based on the generated dependency graphs. A generated dependency graph includes hierarchical dependency information with respect to the objects of the resource.

18 Claims, 7 Drawing Sheets

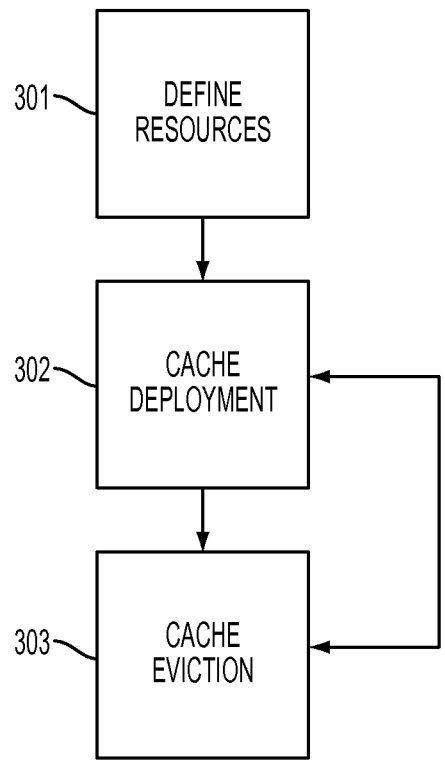

METHOD, APPARATUS, AND COMPUTER READABLE MEDIUM FOR FLEXIBLE CACHING OF RESOURCE ORIENTED WEB SERVICES

BACKGROUND

1. Field

The present disclosure broadly relates to the fields of databases and web services, and specifically, to optimizing retrieval of data.

2. Description of the Related Art

Many data-intensive services are provided in a cloud i.e., are scattered in remote locations from the client. Accordingly, many of these services are implemented over the HyperText Transfer Protocol (HTTP). That is, HTTP is used for the servers providing the data to communicate with the remote clients that receive the data. Because of the stateless characteristics of HTTP, the state information is not stored on the server but is managed by the client as such each request from the client contains all the information necessary for the server to process the request.

Today, the trend for new, internet-centric, services is to adopt a Representation State Transfer (REST) based architecture. REST provides a uniform interface between various components of the system. REST-based (aka. RESTful) implementations are decoupled from the services they provide, which encourages independent development of this uniform interface. REST is an abstraction of the architectural elements within a distributed multimedia system. REST ignores the syntax and specifics of various components in the system and instead focuses on the role of the resource and its interaction with other components.

REST is convenient for facilitating communication among various different components in the system. On the other hand, this uniform interface may not be the optimal solution for a particular system. The uniform nature of REST does not allow for specific optimization which could improve efficiency of transmissions. Accordingly, some data services drift away from the strict implementation of the REST. However, many of these data services still adhere to the following two principles:

1. The first principle is to use the HTTP-defined interface. That is, the commands still employ the HTTP verbs (POST, PUT, GET, DELETE, HEAD) according to their design, thus enabling properties like safety (GET, HEAD) and idempotence (PUT, DELETE), see e.g., article by Leonard Richardson and Sam Ruby titled "RESTful Web Services." O'reilly Media, May 2007.

2. The second principle is to adopt a resource-oriented representation of the data where each data object is treated as a resource that is addressable via (at least) a uniform resource identifier (URI).

When these two principles are adopted, even in these REST modified systems, HTTP caching is enabled, which is important to the overall performance of web services. The multimedia data of complex and/or remote systems being transmitted in the cloud would benefit from cache optimization e.g., HTTP caching optimization techniques. Further, because of the nature of HTTP caching, a robust policy to preserve integrity of the cache is needed including evicting stale data, evicting broken dependencies, and incomplete objects.

SUMMARY

According to an aspect of exemplary embodiments, caching optimization techniques are provided, which maintain integrity of data in the cache. For example, a generated dependency graph and an Entity Tags (ETags) are used to maintain integrity and preserve dependencies of the data in the cache.

According to an aspect of one or more of exemplary embodiments, a caching method includes: analyzing a structure of a resource in a system which exposes resources to clients, generating a dependency graph of objects linked to a resource based on the analyzed structure of the resource, and managing caching of resources based on the generated dependency graphs. The generated dependency graph may include hierarchical dependency information with respect to the objects of the resource.

According to yet another aspect of one or more of exemplary embodiments, a cache management apparatus is provided, which includes a memory storing a plurality of software instructions and a processor executing the plurality of software instructions. The instructions include: analyzing a structure of a resource in a system which exposes resources to clients, generating a dependency graph of objects linked to a resource based on the analyzed structure of the resource, and managing caching of resources based on the generated dependency graphs. The generated dependency graph includes hierarchical dependency information with respect to the objects of the resource.

According to yet another aspect of one or more of exemplary embodiments, a non-transitory computer readable recording medium storing a plurality of computer-executable software instructions is provided, which includes: analyzing a structure of a resource in a system which exposes resources to clients, generating a dependency graph of objects linked to a resource based on the analyzed structure of the resource, and managing caching of resources based on the generated dependency graphs. The generated dependency graph includes hierarchical dependency information with respect to the objects of the resource.

According to yet another aspect of one or more of exemplary embodiments, a cache management apparatus is provided, which includes an analyzer configured to analyze a structure of a resource in a system which exposes resources to clients, a generator configured to generate a dependency graph of objects linked to a resource based on the analyzed structure of the resource, and a manager configured to manage caching of resources based on the generated dependency graphs. The generated dependency graph includes hierarchical dependency information with respect to the objects of the resource. One or more of the analyzer, the generator, and the manager includes one or more hardware components such as a processor, a controller, a microprocessor, and so on.

BRIEF DESCRIPTION OF THE DRAWINGS

Certain aspects will become more apparent by describing in detail illustrative, non-limiting embodiments thereof with reference to the accompanying drawings, in which like reference numerals refer to like elements in the drawings.

FIG. 3 is a flow chart illustrating operational flow of caching according to an exemplary embodiment.

FIG. 4 is a table illustrating defining resources for caching according to an exemplary embodiment.

DETAILED DESCRIPTION OF EXEMPLARY EMBODIMENTS

In the following detailed description of exemplary embodiments, reference will be made to the accompanying drawings, in which analogous functional elements are designated with same numerals. The aforementioned accompanying drawings show by way of illustration and not by way of limitation to further understanding of exemplary embodiments. These exemplary embodiments are described in sufficient detail to enable those skilled in the art to practice the inventive concept and it is to be understood that other implementations may be utilized and that structural changes and/or substitutions of various elements may be made without departing from the scope and spirit of inventive concept. The following detailed description of exemplary embodiments is, therefore, not to be construed in a limiting sense. Additionally, the various exemplary embodiments as described may be implemented in the form of software running on a general purpose computer, in the form of a specialized hardware, or a combination of software and hardware.

In exemplary, non-limiting embodiments, it is possible to optimize HTTP caching in various systems. In fact, exemplary, non-limiting embodiments may optimize HTTP caching in any web services. Some examples of the various systems in which the HTTP caching may be optimized include Cube Engine, Query Engine, Media Engine, and other database systems. Cache optimization is especially important in the context of services that involve multiple, distant, servers and deal with complex structures.

In an exemplary embodiment, caching is optimized in a digital locker system. A digital locker system is an online repository of digital rights for various contents like movies, songs or eBooks. Although a digital locker may hold rights for any type of content, in an exemplary embodiment, the digital locker relates to entertainment-related data i.e., the entertainment-related digital locker. By having a centralized repository, consumers no longer need to worry about the location or accessibility of their entertainment library. A digital locker also makes it easy for retailers to manage their customers' library and sell them more content. The digital locker system utilizes a storefront platform to provide retailers, content and service providers the opportunity to seamlessly integrate and manage multimedia rights. Although an exemplary embodiment describes cache optimization in the context of managing multimedia rights, one of ordinary skill in the art would readily appreciate that it is applicable to other web services such as online shopping and so on.

Figure 1:
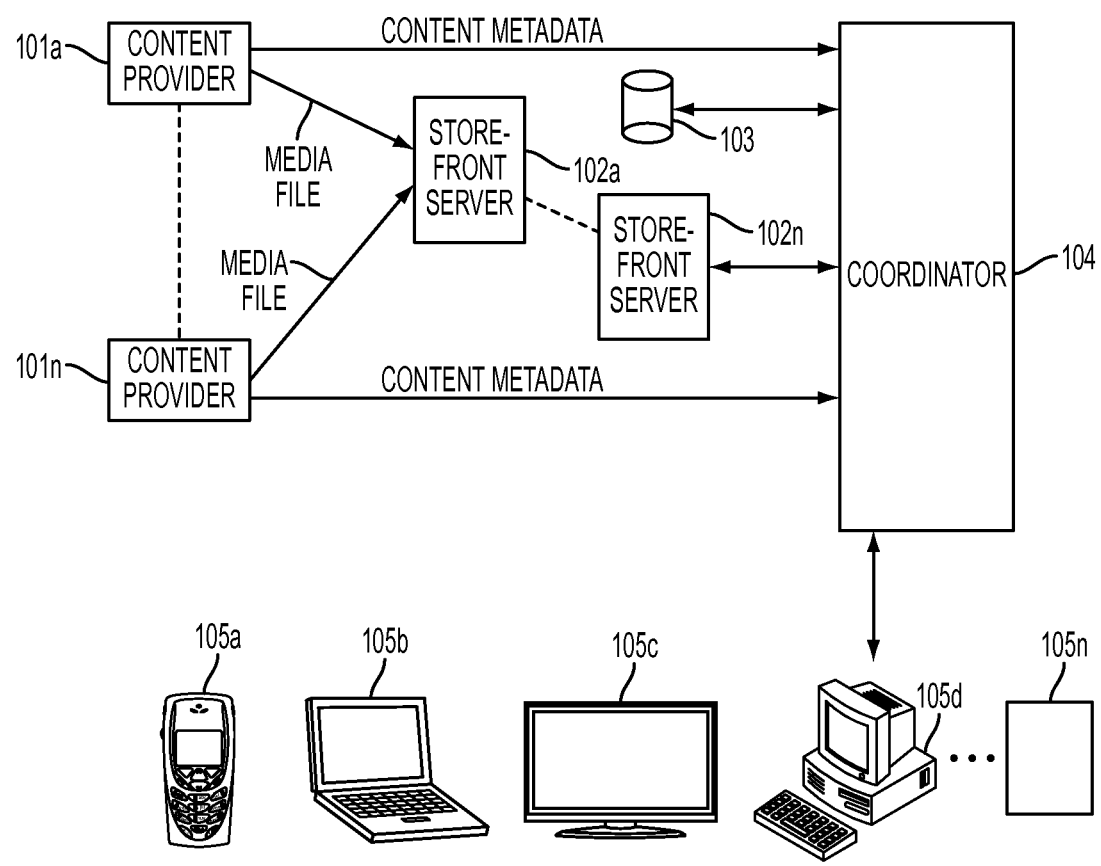
FIG. 1 is a block diagram illustrating a digital locker system according to an exemplary embodiment.

FIG. 1 is a block diagram illustrating a digital locker system according to an exemplary embodiment.

In FIG. 1, content providers 101a . . . 101n transmit content such as media files to various storefront servers 102a . . . 102n, which may be remote from each other. In an exemplary embodiment, the content providers may be remote servers which are sources of content and content metadata and are implemented by various content owners and their partners e.g., radio stations, television channels and so on. Each of the content providers may include one or more processors and a memory. The multimedia data may include video, audio, still images, and text files and any combination of the foregoing.

The storefront servers 102a . . . 102n provide a storefront service and may be referred to as Retailers. The storefront service provided via the storefront servers 102a . . . 102n receives the media file prepares it for retail offering i.e., to be provided for an online sale or renting. The storefront service may include cataloging, indexing, etc. the media file based on metadata provided by the Coordinator. This is provided by way of an example only and not by way of a limitation. The content providers 101a . . . 101n may directly provide metadata for the contents to the storefront service in yet another exemplary embodiment. The servers 102a . . . 102n may each include at least a memory and a processor to generate identifiers and index information for the received media files i.e., contents. The index information and other search keywords may be obtained by parsing by one of the server 102a . . . 102n the provided metadata. The server 102 may further communicate with the Coordinator 104. The Coordinator stores content metadata and other data like accounts, users and digital rights in a datastore such as a database 103. In an exemplary embodiment, the datastore may be a set of distributed memories which store the digital contents and may also store the corresponding search keywords and other metadata.

The Coordinator 104 may be one or more servers that facilitate interoperability across the multimedia ecosystem including communication with the clients 105a . . . 105n and content providers 101a . . . 101n. The Coordinator 104 may be considered an intermediate component which manages user accounts, registers content right identifiers generated by a storefront management servers 102a . . . 102n and the corresponding metadata. The Coordinator 104 may further provide a digital rights management (DRM) management for the multimedia ecosystem. It may further coordinate device security and user rights. The Coordinator 104 is an exemplary security and rights manager and is described in greater detail below.

The client devices 105a . . . 105n connect to the storefront servers 102a . . . 102n and purchase or access desired content. Client devices can be added to user accounts or obtain content metadata at the Coordinator 104. The client devices 101a . . . 101n may include a mobile terminal 105a such as a smartphone, a tablet or a laptop 105b, a IPTV 105c, a personal computer 105d, and so on, 105n.

Figure 2:
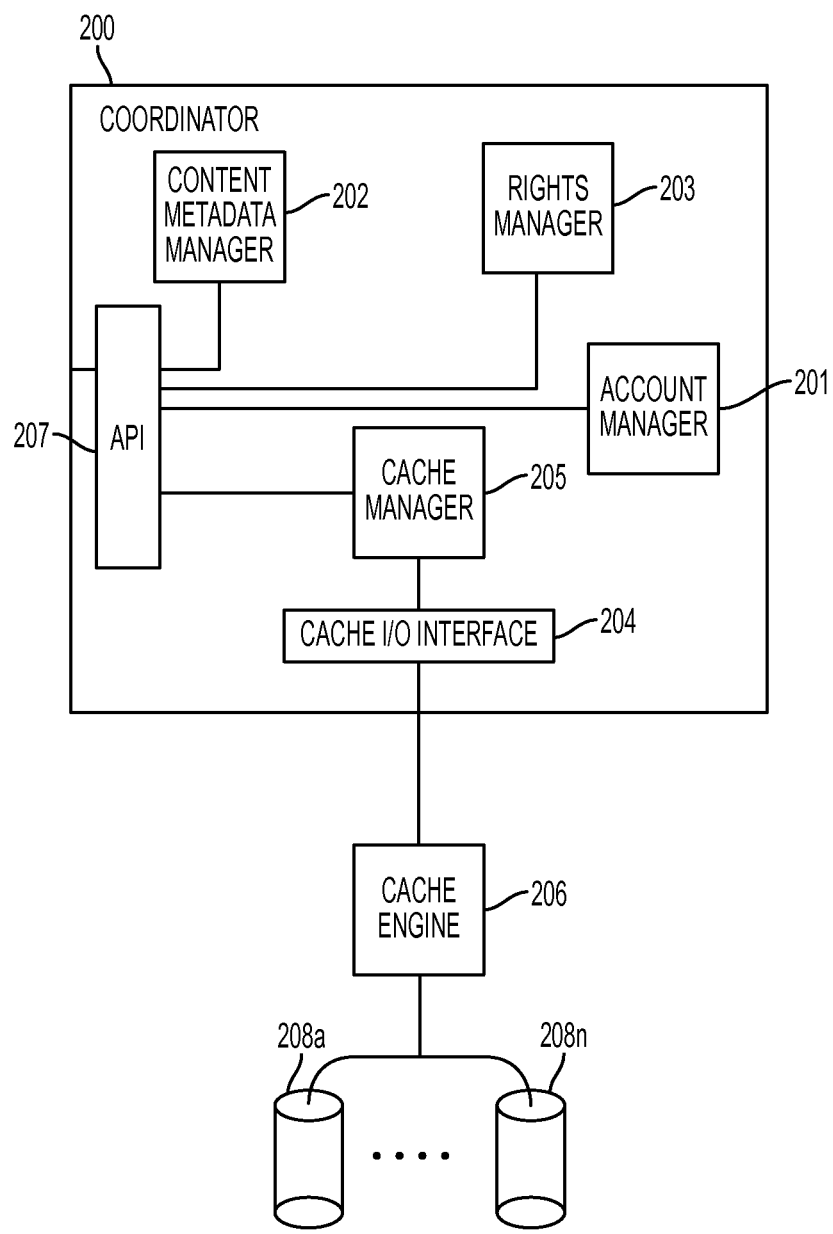
FIG. 2 is a block diagram illustrating a Coordinator according to an exemplary embodiment.

FIG. 2 is a block diagram illustrating a Coordinator according to an exemplary embodiment.

In FIG. 2, a Coordinator 200 includes an account manager 201, a content metadata manager 202, and a rights manager 203. The Coordinator 200 may further include a cache input and output interface 204 and a cache manager 205, and an Application Programming Interface (API) to communicate with the client 105a . . . 105n. and providers 101a . . . 101n, shown in FIG. 1.

In an exemplary embodiment, the Coordinator 200 includes the account manager 201. The account manager 201, receives account information and manages all account related data like the list of users or devices within the same account. The Coordinator 200 further includes the content metadata manager 202, which receives via the Coordinator API 207 content identifiers (ID) and content metadata from content providers. An asset, which is a digital representation of content (films, television programs, video games, electronic books, etc.), is described to the system and its users using metadata (data about the data). Metadata may be created, updated and deleted by content providers, and may be retrieved by the web portal, storefront servers, and so on. The content metadata manager 202 enforces scheme-independent requirements and scheme-specific requirements in retrieving the content metadata and providing it to the requestor such as users 105a...105n. Storefront servers can then leverage the metadata and content IDs on their web site where they sell content to consumers. Similarly, devices may use the metadata to present their users with relevant information about their digital locker.

The Coordinator may further include a rights manager 203, which retrieves and provides entitlements of various accounts/users and the content providers. The Coordinator 200 may apply a number of policies (definitions of allowed behavior) which govern access control and consent rules when the Coordinator 200 interacts with Nodes such as users and content providers via the API 207. These rules are applied to Users, Accounts, Rights, and Devices. The Coordinator 200 may retrieve rights and content metadata and/or store the received rights or content metadata to create a streaming session. In an exemplary embodiment, the rights manager 203 may grant authorization to create a stream by responding with a unique stream identifier and an expiration timestamp based on the rights that a particular account possess and based on a number of active sessions. The rights manager 203 may request deleting a stream upon its expiration.

Information may further be cached via a cache input/output interface 204, as detailed below. A cache manager 205 manages the caching of data provided to requesters and is described in greater details below. In an exemplary embodiment, the caching manager 205 is implemented in a Coordinator 200. However, one of ordinary skill in the art would readily appreciate that a cache manager 205 may be implemented as a separate standalone component or at the service providers or even at a client site.

Briefly, the cache manager 205 may request the cache engine 206 to store data in one or more of the cache stores 208a to 208n. The cache manager 205 may further request the cache engine 206 to obtain an item from the cache stores 208a to 208n or may request an eviction (deleting) of certain data in the cache stores 208a to 208n. The cache engine 206 may be implemented as a remote dedicated server that has at least one processor and the cache manager 205 may be implemented as a functional component of the Coordinator 200. The cache engine 206 communicates with the cache manager 205 via the cache input/output interface 204. The cache manager 205 and the cache engine 206 may be implemented integrally or separately. In one exemplary embodiment, the cache manager 205 and the cache engine 206 may be an integral functional component of the Coordinator 200. In yet another exemplary embodiment, the cache manager 205 and the cache engine 206 may be a dedicated processor or a microprocessor provided in the Coordinator 200 or may be a separate server remote from the Coordinator 200. The data stores 208a...208c may be distributed memory e.g., remote databases.

In an exemplary embodiment, the Coordinator 200 includes a processor and a memory and the managers may be implemented as a software component or as a combination of a software component and a hardware component. For example, one or more managers may be an FPGA and/or ASIC.

In related art, caching, especially cache eviction algorithms focus on usage-based approaches. There is surprisingly little work around the use of a more resource-oriented approach or on leveraging RESTful architecture, discussed in the related art section. In an exemplary embodiment, the HTTP caching is optimized using the resource-oriented nature of a RESTful architecture. That is, the caching combines the principles of the HTTP caching and the principles of RESTful architecture for an optimized and more customized caching.

FIG. 3 is a flow chart illustrating operational states of caching according to an exemplary embodiment. In operation 301, the resources are identified and defined for optimization of cache deployment and accurate evictions. In an exemplary embodiment, the definitional state may take place at an initialization phase e.g., prior to the execution operations. Of course, the definitional state may be invoked at a later time during the operations of the system e.g., if the resource structure (definition of one or more objects in the system) is updated. In operation 301, maximum time in cache may be assigned and resource dependencies may be defined, as described below in greater detail.

In operation 302, the cache is deployed, potentially with the requested resources based on their definitions and identification obtained from operation 301. As presented in FIGS. 1 and 2, requests are coming to the Coordinator from various actors of the ecosystem like content providers, devices or storefront servers. It is also noted, however, that cache deployment in operation 302 may include preloading popular resources into cache such as VIP accounts and popular contents to improve the speed of providing these popular resources prior to the system use i.e., during the initialization phase.

In operation 303, a resource is evicted from the cache based on the definitions obtained in operation 301 and based on preset algorithms described in greater detail below. Cache eviction addresses deleting stale resources and modified resources and all other related resources present in cache, as described in greater detail below. Cache eviction also allows maintaining the size of the cache within given limits. In an exemplary embodiment, the resource eviction in operation 303 may occur when messages are received by the cache engine which would indicate a change to the resource such as a deletion of a resource or its part, and/or modification of a resource and/or its part. In an exemplary embodiment, the definition state 301 must occur prior to cache deployment 302 and cache eviction 303. It is noted, that in an exemplary embodiment, additional cache definition, deployment and further cache evictions may occur in any order.

FIG. 4 is a table illustrating defining resources for caching according to an exemplary embodiment. In an exemplary definition operation, resources are assigned into categories and a respective time to live (TTL) value is assigned. With respect to the multimedia system according to an exemplary embodiment, the data sets manipulated by a web service can be classified in buckets based on their change frequency or in other words the stability of the resource representation. For the multimedia system, three distinct data sets can be identified, as shown in FIG. 4 according to an exemplary embodiment. Row 401 shows Static Data set which includes title metadata, box art, images, etc. This type of data is by nature highly unlikely to change. Row 402 shows Stable Data set which comprises data which may change, although infrequently. For instance, user or account information is considered to belong to this data set. This is provided by way of an example and not by way of a limitation. Dynamic Data set, which is shown in Row 403, as the name implies, describes data that will change almost on a call basis. Examples of such data are data streams, entitlements, etc.

In column 404, it is shown that each category is assigned a value for its time to live (TTL) in the cache according to an exemplary embodiment. In an exemplary embodiment, the more dynamic the data, the shorter TTL value will be assigned. In yet another exemplary embodiment, it is possible to further define a category for a data not be cached at all. That is, if the data appears to be constantly changing (very dynamic) or for security purposes, it is possible to define this data with a TTL value of 0 seconds i.e., to instruct the cache manager (and all other relying parties) not to cache the data at all.

The TTL value, according to an exemplary embodiment, will be communicated by the resource authority to the requester using the HTTP max-age cache-control value.

In an exemplary embodiment, requesters can utilize HTTP cache negotiation strategies, which include If-Modified-Since HTTP headers. Similarly, a resource authority may incorporate, as appropriate, the Last-Modified HTTP header, as discussed in greater detail below. In an exemplary embodiment, the HTTP header can also include the max-age (TTL) values described above. Those headers provide expiration information that indicates when a response should be considered stale and thus should not be used as-is before a refresh. In an exemplary embodiment, these headers may include the TTL value assigned based on the type of data. In an exemplary embodiment, when new data arrives, its type is determined e.g., based on information like the invocation URI used or the format of the data. Based on the determined type of data, it is classified into one of the data types and a corresponding TTL value is assigned i.e., included in the HTTP header and provided for caching. This is provided by way of an example and not by way of a limitation.

In addition to the TTL based on data types, the RESTful principles are leveraged to perform cache management based on the HTTP operation being performed. To achieve this, the Coordinator's caching manager maintains an {ETags, resource URI} mapping table such as the one shown below.

In this table, the ETag column, represents a random value assigned to the respective ETag i.e., ETag identifier (ID). The URI column represent the invocation URI used by requesters to access a particular resource (for retrieval, update or deletion).

| ETag | URI | Resource Type | Dependencies |
|------|-----|---------------|--------------|
| 1234 | /Account/account123/User/abc | User | 5678, 3456 |
| 5678 | /Account/account123 | Account | |
| 9012 | /Account/account123/User/xyz | User | 5678, 3456 |
| 3456 | /Account/account123/User/List/1 | User list | 5678 |

The Dependencies column lists the ETag IDs of cached entities that are related to a particular resource. That relationship may be established using the resource dependency graph, described in further detail below. For instance, if the user abc (ETag 1234) is modified or deleted, it must be evicted from the cache. Moreover, the table informs the cache manager that the resources identified by ETags 5678 and 3456 must also be evicted from the cache (the list of users and the account both contain user abc).

For some resources, at any given time, there is a one-to-one mapping between an ETag and the resource URI. More complex structures, however, may relate to several ETags (one for each sub-element of the resource). For instance, collection resources (such as the Locker, a list of streams or the list of users in an account) have unique cache control processing requirements. In particular, resource changes, policy changes, Node permission changes, etc. may invalidate any client caches, and the multimedia system must consider such changes when evaluating the last modification date-time of the resource being invoked.

To determine dependencies between entities stored in cache, a dependency graph is generated. The dependency graph is created to help determine the cascading effects of invalidating a resource in the cache. In other words, one needs to precisely determine other resources that should also be evicted from the cache (i.e., the dependent resources).

In an exemplary embodiment of a digital locker system, there are two types of dependencies: 1) the structural dependencies and 2) the ad hoc dependencies. The structural dependencies may be obtained by simply inspecting a resource data model (e.g. XML schema or JavaScript Object Notation) and it is easy to identify objects contained or referred to by a given resource.

Figure 5A:
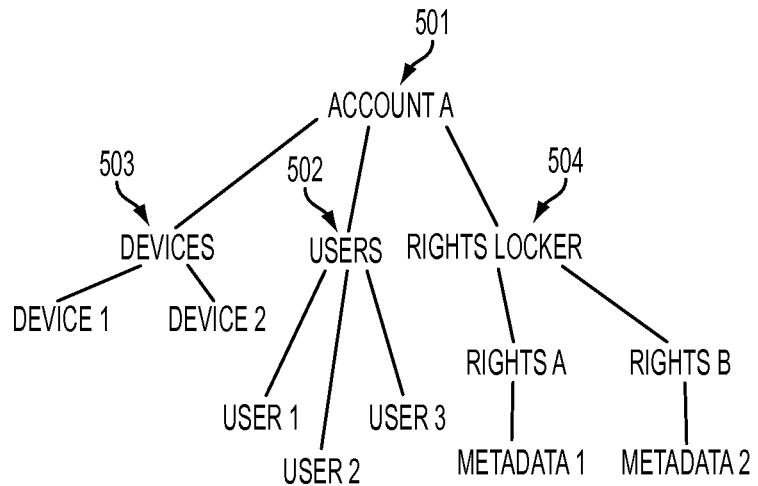
FIGS. 5A-5B are graphs illustrating structural dependencies of various resources according to an exemplary embodiment.
Figure 5B:
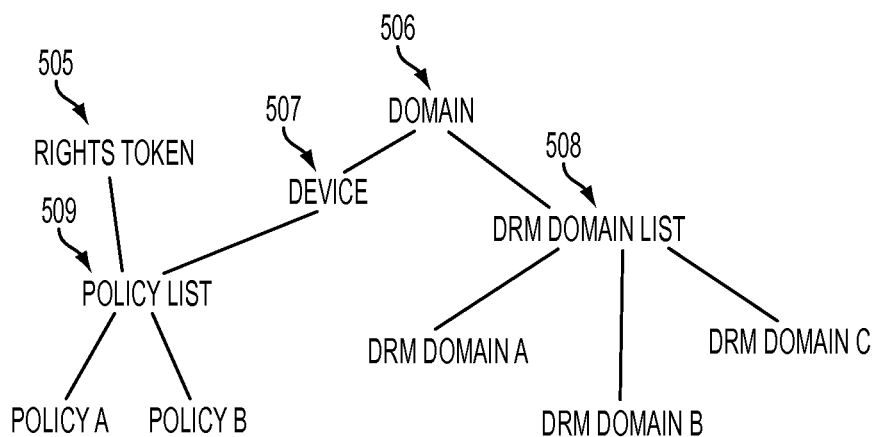

FIGS. 5A-5B are graphs illustrating structural dependencies of various resource according to an exemplary embodiment.

In FIG. 5A, account resource 501 is at a top level of a tree structure dependency. It contains users 502, devices 503 and a rights locker 504. Within users 502, each user is the next level; the rights locker 504 contains user rights. Devices 503 may be another sublevel of an account and contains several individual devices. A dependency graph in an exemplary embodiment is a directed graph made of vertices and edges. A vertex may be represented by a class called GraphNode and there exists a directed edge between vertices that are connected. The GraphNode class according to an exemplary embodiment contains the following properties:

Name.

List of all the nodes that it is linked with.

List of URLs that can be used to represent it.

With the accumulation of graph nodes, a directed graph is constructed so that each node has information about the entire list of nodes connected to it. In an exemplary embodiment, this graph may be constructed at the system boot time by an injection of xml.

This xml contains a following representation for terminal nodes:

| 1 | <Node> |
| 2 |     <Name>BasicAsset</Name> |
| 3 |     <URLList> |
| 4 |         <Value>/Asset/Metadata/Basic<Value> |
| 5 |         <Value >/Asset/Metadata/Basic/{1D}<Value> |
| 6 |     </URLList> |
| 7 | </NorIA> |

Non terminal nodes are represented as follows:

| 1 | <Node > |
| 2 |     <Name>Account</ Name> |
| 3 |     <URLList> |
| 4 |         <Value>/Account<Value> |
| 5 |         <Value>/Account/{1D}<Value> |
| 6 |     </URLList> |
| 7 |     <VertexList> |
| 8 |         <Value> |
| 9 |         UserList |
| 10 |     </Value> |
| 11 |     <VertexList> |
| 12 | </Node> |

According to an exemplary embodiment, the system or a developer may parse the XML schema for various resources and automatically generate or manually generate a dependency graph such as the one described above and depicted in FIG. 5A for example.

In FIG. 5B, it is shown where an element may be shared by various other elements. As shown, the top levels are the rights token 505 and the domain 506, the next sublevel of the domain 506 is the device 507 and the DRM Domain List 508. The DRM Domain List 508 includes various individual domains: DRM Domain A, DRM Domain B, DRM Domain C. The Device 507 includes a Policy List 509, which also happens to be a sub level of the Rights Token 505. The Policy List 509 includes policies such as Policy A and Policy B.

The second type of dependencies is the ad-hoc dependencies. These types of dependencies relate to dependencies that cannot be directly derived from a data model. That is, some resource relationships exists that cannot be directly derived from the data model. Usually such a relationship is expressed at the application level (e.g. a policy applied to a user resource) and requires human intervention. In an exemplary embodiment, these types of dependencies may be added to the dependency graph manually by an administrator or maintained separately. In an exemplary embodiment, graphs may be built using various applications such as Jgrapht.

The TTL values and the generated dependency graph with the added ad hoc dependencies are then used to generate the {ETags, resource URI} mapping table during the cache deployment and cache eviction processes according to an exemplary embodiment. With respect to the data cache deployment, in an exemplary embodiment, the static data may be preloaded into cache prior to use whereas other types of data may be cached during use. Unlike the other data sets, the static data set has a fairly distinctive usage pattern: changes only come from the Studios so that, to client applications, it is essentially read-only data. However, this data set is frequently accessed by the client applications (to display title pages, digital locker etc.). For these reasons, the static data set is cached by several reverse caching proxies located next to the customers.

According to an exemplary embodiment, the improved caching method described in further detail below may be applied to various caching techniques such as HTTP caching, which includes ETags. In an exemplary caching method, the system recognizes the HTTP caching commands such as GET, POST, etc. and updates data in cache accordingly.

When a storefront server, a device or a content provider accesses a resource hosted at the Coordinator (e.g. an account, a digital right or content metadata), the incoming request is intercepted and analyzed by the cache manager 205. If the requested resource is not cached, the request is then simply forwarded to other components of the Coordinator. If the resource is cached, the cache manager may respond directly (on behalf of the Coordinator) or forward the request to other components of the Coordinator. Such decision is based upon freshness of the data as well as the type of access (retrieve, update etc.) requested.

Figure 6:
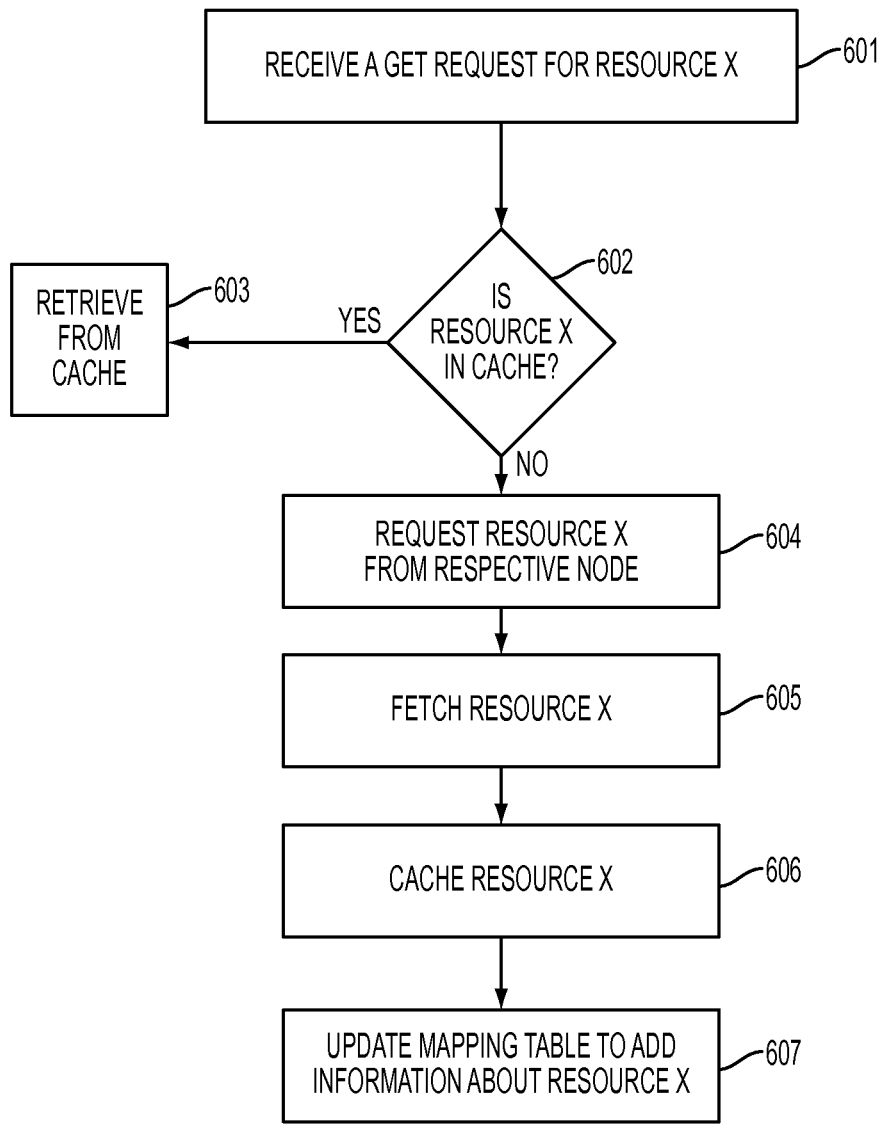
FIG. 6 is a flow chart illustrating a method of deploying data in cache according to an exemplary embodiment.

FIG. 6 is a flow chart illustrating a method of deploying data in cache according to an exemplary embodiment.

In FIG. 6, in operation 601, the Coordinator receives, for example, a GET request for a resource X. In Operation 602, the Coordinator sends a request to the cache engine to check if the resource X is already present in cache. If the resource is present in cache, it is retrieved from cache in operation 603. On the other hand, if the resource X is not present in cache, the Coordinator requests the resource X from the database 103. This is provided by way of an example only and not by way of a limitation. The Coordinator may be connected to various databases which store user accounts, and other digital rights policies. In other words, the Coordinator may determine where the Resource X may be stored and forward the request to the appropriate Node. In operation 604, the resource is requested from a respective node e.g., entity such as a database. In operation 605, the resource X is fetched from the respective node and returned to the Coordinator. In operation 606, the resource X is cached. In particular, the resource X is stored in cache and is assigned an ETag value i.e., ETag ID. In operation 607, the {ETags, resource URI} mapping table is updated to add information about the resource X. That is, in an exemplary embodiment, new row is added to the ETags mapping table in which the ETag ID is added and corresponding resource identifier such as a link or a pointer to the location where the resource is stored e.g., URI and a type of resource and a list of ETag IDs to other resources in the cache that depend on this resource. Storing the type of resource in addition to the URI may help rapidly identify the resource in the dependency graph. In addition, it may also help the cache management or statistics to identify cache usage.

Figure 7:
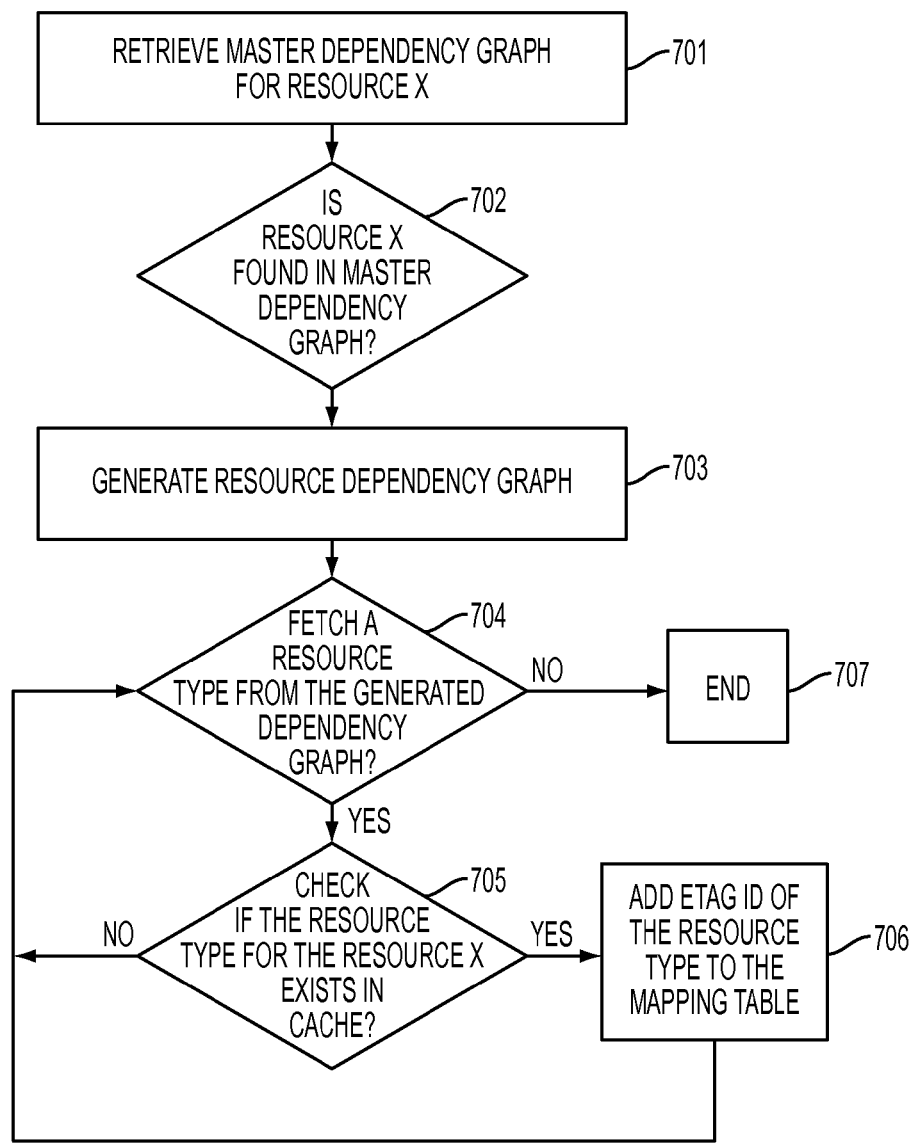
FIG. 7 is a flowchart illustrating a method of populating a mapping table with dependencies according to an exemplary embodiment.

FIG. 7 is a flowchart illustrating a method of populating a mapping table with dependencies according to an exemplary embodiment.

In operation 701, a master dependency graph is retrieved. In operation 702, the resource X is located. A resource dependency graph is generated in operation 703. This resource dependency graph comprises all resource types that are related to the resource X. In another exemplary embodiment, a resource dependency list may be generated, which will list all resources related to the resource X. In operation 704, a resource type is obtained from the generated resource dependency graph or the dependency list. In operation 705, the cache is searched for any resource (of the type determined in operation 704) that is hosted within the same account. Due to its hierarchical structure, the URI stored in the {ETag, URI} table indicates the overarching Account the resource is in. For instance, if a user resource URI is "/Account/123/User/abc, the cache can determine that the resource abc of resource type User is contained in the Account 123. If the resource/Account/123/UserList/1 is updated, the cache manager, using the UserList dependency graph knows it should search the cache for all resources of the type User that belong to the Account 123. The row with the URI "/Account/123/User/abc" and resource type User matches this search and is thus a dependency to theUserList resource.

The cache engine checks if the resource of the resource type Y, which depends on the resource X exists in cache in operation 705. If not, the cache engine returns to operation 704 to check the next resource type. If in operation 705, the resource of the resource type Y, which depends on the resource X is found in cache, the ETag ID of the found resource is added to the dependency column of the {ETags, resource URI} mapping table. The cache engine then returns to operation 704 to fetch the next resource type present in the generated dependency graph or dependency list. If no more resource types are present in the generated dependency graph 704 (No), the cache engine ends the process of populating the dependency column of the mapping table for the resource X in operation 707.

Using the above described exemplary definitions i.e., generation of the master dependency graph and deployment operations, eviction of the cache may be made more accurate, as detailed below.

Figure 8:
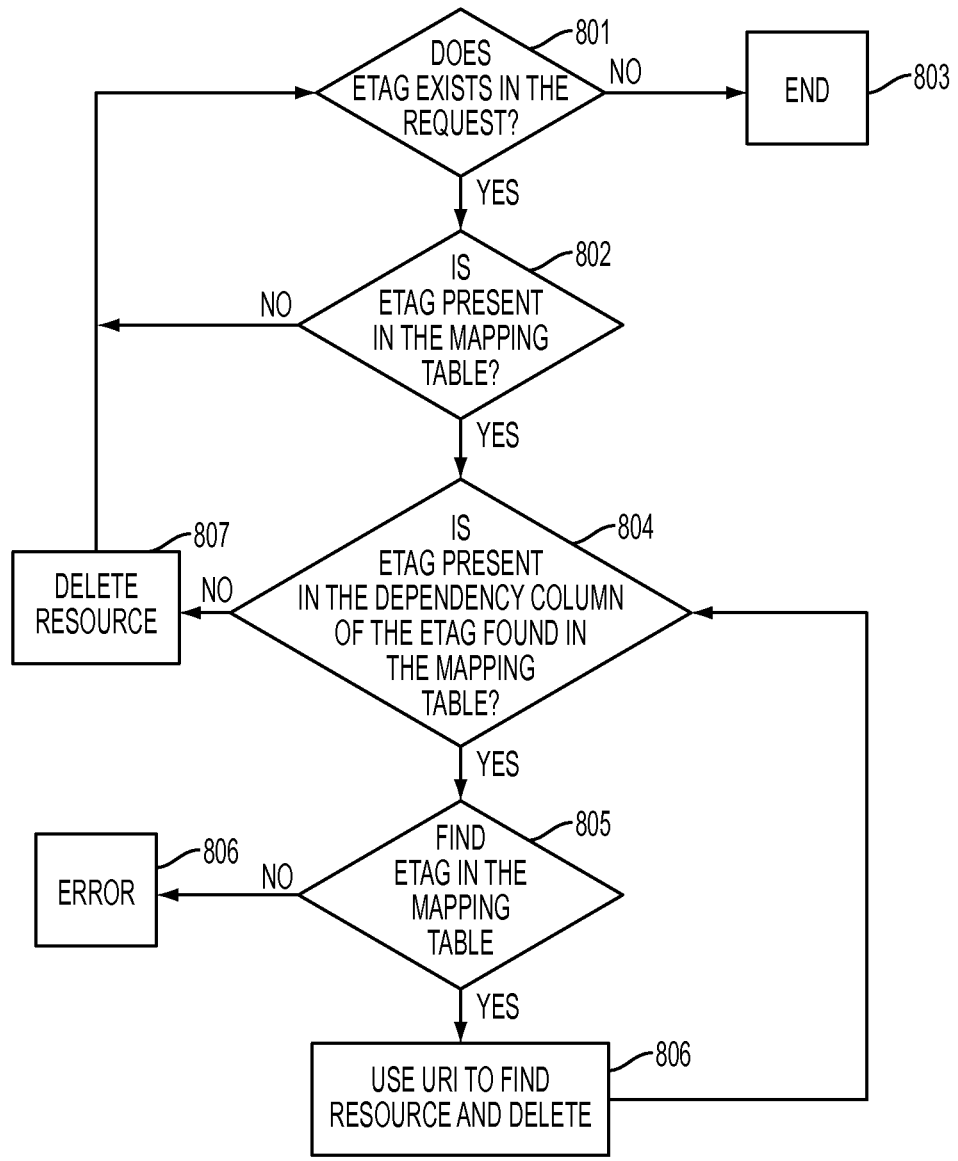
FIG. 8 is a flow chart illustrating a method of evicting a data entry from cache according to an exemplary embodiment.

FIG. 8 is a flow chart illustrating a method of evicting a data entry from cache if a delete command is received according to an exemplary embodiment.

In an exemplary embodiment, when a PUT or a DELETE request is received for a resource for which there is an entry in the {ETags, resource URI} mapping (i.e. the resource is cached), that entry must be removed. That is, when a resource stored in cache needs to be updated or deleted, the entry must be removed from cache. In operation 801, the cache engine parses the received request to retrieve an ETag. If ETag is retrieved from the request (Yes in Operation 801), the cache engine searches the {ETags, resource URI} mapping table to find the retrieved ETag. In operation 802, the cache engine determines if ETag is present in the {ETags, resource URI} mapping table. If ETag is not present in the {ETags, resource URI} mapping table (No in Operation 802), the cache engine returns to operation 801 to process next ETag in the request. If no more ETags exist in the Request (No in Operation 801), the process ends in operation 803.

On the other hand, if the ETag is present in the {ETags, resource URI} mapping table (Yes—Operation 802), the cache engine checks the dependency column for the found ETag to determine if a dependent resource exist in cache in operation 804. If ETag is present (Yes in Operation 804), the entry for the related resource is found in the {ETags, resource URI} mapping table using the found ETag in operation 805. That is, in an exemplary embodiment, an iterative process is executed where in addition to deleting the cache entry for the resource when an update or removal of the resource takes place, the related resources stored in cache are also deleted to avoid inconsistencies. Using the URI in the {ETags, resource URI} mapping table, the entry is deleted i.e., the resource is removed from the cache and the entry for the resource is deleted from the {ETags, resource URI} mapping table, in operation 806. The process then returns to operation 804, to search for the next ETag that may exist in the dependency column of the resource to be removed or updated. When the related resources are evicted from cache i.e., there are no more ETags identifies in the dependency column (No—in operation 804), the resource identified in the request is delete from cache and the cache table is updated to delete the entry for the resource in operation 807. The process then returns to operation 801 to process next ETag identified in the request. The exemplary method shown in FIG. 8 shows iteration of processing resources identified in the request.

In an alternative embodiment, the method of evicting cache may be performed iteratively. For example, if a request contains a first ETag, this ETag is located in the {ETags, resource URI} mapping table e.g., a first entry and the dependency column is inspected. First dependency ETag is retrieved from the dependency column and the {ETags, resource URI} mapping table is searched for entry which corresponds to the first dependency ETag. Once the entry in the {ETags, resource URI} mapping table is found e.g., a second entry, the dependency column of the second entry is inspected and it's a second dependency ETag is retrieved from this column. The cache engine then searches the {ETags, resource URI} mapping table for the second dependency ETag entry. This process is iteratively repeated until the dependency entry does not include any dependency ETags. The process then returns to iteratively delete the dependent resources and the corresponding entries in the {ETags, resource URI} mapping table. That is, in an exemplary embodiment, the URL is used to discover the initial vertex name. This name is then used to find a vertex in the directed graph. From that vertex, a sub graph of nodes to be deleted may be generated by performing a depth first search.

In an exemplary embodiment, for each resource that is cached, a list of related Nodes that are dynamically maintained is also cached (based on the dependency graph). That is, whenever a resource is added to the cache, the cache manager can search the cache for resources that are ancestor of the newly added one and add their ETag to the dependency list of the newly added resource. By ancestor, it means all resources, within the same account, for which their dependency graph include the resource type of the newly added resource. This approach is more efficient during cache eviction albeit more costly to maintain during cache population. For instance, adding User/Account/account123/User/xyz in the cache would result in adding the ETags of Account 123 and UserList 1 in the dependencies cell for the row of the newly cached resource.

In an exemplary embodiment, as explained above, the storing of the data into the cache includes determining a type of the data for more efficient resource retrieval. The data type may include a static data type, a stable data type, and a dynamic data type, as described above with different time to live (TTL) values being assigned to the cached data based on the determined type of data. The storing of the static data type into the cache may include invoking a data mutator, which pushes the data to a reverse caching proxy host using an Rsync command, and storing by the reverse caching proxy host the data into the cache. When the determined type of data is other than the static data type, the storing the data into the cache is performed by a servlet filter, which includes an authentication layer to authenticate requests for data in the cache, a caching layer, which stores data to be cached into external data stores, and an application interface layer which handles communications with various applications. This is provided by way of an example only and not by way of a limitation.

Accordingly, in an exemplary embodiment, a combination of a RESTful architecture is combined with HTTP caching to provide an innovative cache eviction mechanism based on resource dependency graph.

In yet another exemplary embodiment, the generated dependency graph may be applied to load balancing incoming HTTP request, thus better leveraging the distributed cache architecture.

In an exemplary embodiment, such as the one depicted in FIG. 2, the Coordinator, and/or the cache engine may be implemented on a computer-readable medium. The term "computer-readable medium" as used herein refers to any medium that participates in providing instructions to a processor for execution. A computer readable medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable medium would include the following: an electrical connection having two or more wires, a portable computer diskette such as a floppy disk or a flexible disk, magnetic tape or any other magnetic medium, a hard disk, a random access memory (RAM), a read-only memory (ROM), an erasable programmable read-only memory (EPROM or Flash memory), a memory card, any other memory chip or cartridge, an optical fiber, a portable compact disc read-only memory (CD-ROM), any other optical medium, punchcards, papertape, any other physical medium with patterns of holes, or any other medium from which a computer can read or suitable combination of the foregoing.

In the context of this document, a computer readable medium may be any tangible, non-transitory medium that can contain, or store a program for use by or in connection with an instruction execution system, apparatus, or device.

Another form is signal medium and may include a propagated data signal with computer readable program code embodied therein, for example, in a base band or as part of a carrier wave. Such a propagated signal may take any of a variety of forms, including, but not limited to, the electromagnetic, optical, or any suitable combination thereof. The signal medium may include coaxial cables, copper wire and fiber optics, including the wires that comprise data bus. The signal medium may be any medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc. or any suitable combination of the foregoing.

Computer program code for carrying out operations for aspects of the exemplary embodiments may be written in any combination of one or more programming languages, including an object oriented programming language such as Java, Smalltalk, C++, .Net or the like and conventional procedural programming languages. The program code may execute entirely on the user's computer, partly on the user's computer, as a stand-alone software package, partly on the user's computer and partly on a remote computer or entirely on the remote computer or server. The remote computer may be connected to the user's computer through any type of network, including a local area network (LAN) or a wide area network (WAN), or the connection may be made to an external computer (for example, through the Internet using an Internet Service Provider).

The computer-readable medium is just one example of a machine-readable medium, which may carry instructions for implementing any of the methods and/or techniques described herein. Such a medium may take many forms, including but not limited to, non-volatile media and volatile media. Non-volatile media includes, for example, optical or magnetic disks. Volatile media includes dynamic memory.

Various forms of computer readable media may be involved in carrying one or more sequences of one or more instructions to a processor such as a CPU for execution. For example, the instructions may initially be carried on a magnetic disk from a remote computer. Alternatively, a remote computer can load the instructions into its dynamic memory and send the instructions over a telephone line using a modem. A modem local to a computer system can receive the data on the telephone line and use an infra-red transmitter to convert the data to an infra-red signal. An infra-red detector can receive the data carried in the infra-red signal and appropriate circuitry can place the data on the data bus. The bus carries the data to the volatile storage, from which processor retrieves and executes the instructions. The instructions received by the volatile memory may optionally be stored on persistent storage device either before or after execution by a processor. The instructions may also be downloaded into the computer platform via Internet using a variety of network data communication protocols well known in the art.

The flowchart and block diagrams in the Figures illustrate the architecture, functionality, and operation of possible implementations of systems, methods and computer program products according to various exemplary embodiments. In this regard, each block in the flowchart or block diagrams may represent a module, segment, or portion of code, which comprises one or more executable instructions for implementing the specified logical functions. It should also be noted that, in some alternative implementations, the functions noted in the block may occur out of the order noted in the figures. For example, two blocks shown in succession may, in fact, be executed substantially concurrently, or two blocks may sometimes be executed in the reverse order, depending upon the functionality involved. It will also be noted that each block of the block diagram and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology as used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or acts for performing the function in combination with other claimed elements as specifically claimed.

The description of the exemplary embodiments has been presented for purposes of illustration and description, but is not intended to be exhaustive or limiting in any form. Many modifications and variations will be apparent to those of ordinary skill in the art without departing from the scope and spirit of the invention. Embodiments were chosen and described in order to explain operations and the practical applications thereof, and to enable others of ordinary skill in the art to understand various embodiments with various modifications as are suited to the particular use contemplated. That is, various modifications to these embodiments will be readily apparent to those skilled in the art, and the generic principles and specific examples defined herein may be applied to other embodiments without the use of inventive faculty. For example, some or all of the features of the different embodiments discussed above may be combined into a single embodiment. Conversely, some of the features of a single embodiment discussed above may be deleted from the embodiment. Therefore, the present invention is not intended to be limited to the embodiments described herein but is to be accorded the widest scope as defined by the limitations of the claims and equivalents thereof.

What is claimed is:

1. A caching method comprising:
    analyzing a structure of a resource in a system which exposes resources to clients;
    generating a dependency graph of objects linked to the resource based on the analyzed structure of the resource, wherein the generated dependency graph comprises hierarchical dependency information with respect to the objects linked to the resource;
    receiving a request to delete or modify the resource; and
    upon making a determination that the resource is stored in a cache associated with the system:
        locating a vertex in the dependency graph for the resource based on an entity tag for the resource retrieved from an entity tag mapping table;
        identifying a sub-graph based on the vertex in the dependency graph; and
        removing the resource and related resources from the cache based on the identified sub-graph.

2. The method of claim 1, wherein generating the dependency graph is based on structural dependencies between resources identified in a data representation language and wherein the dependency graph comprises vertices and edges.

3. The method of claim 2, wherein each of the vertices comprises an identifier of a node and a list of other vertices that are linked to the node and wherein each of the other vertices are represented by a resource locator.

4. The method of claim 2, wherein the dependency graph is generated at system boot time and wherein the dependency graph is in an extensible markup language (XML) format.

5. The method of claim 1, further comprising:
receiving a response to a user request for data, wherein the data is the resource;
generating a new entity tag for the data;
storing the data in the cache; and
storing the new entity tag in the entity tag mapping table.

6. The method of claim 5, wherein storing the data in the cache comprises determining a type of the data, which is one of a static data type, a stable data type, or a dynamic data type and wherein a time to live value for caching the data is assigned based on the determined type of data.

7. The method of claim 1, wherein the dependency graph comprises entity tags and respective resource identifiers for each vertex on the dependency graph.

8. The method of claim 1, wherein removing the resource and related resources from the cache comprises:
removing the resource from the cache,
determining one or more next levels in the identified sub-graph;
searching the cache for a node of the one or more next levels; and
removing the node when the node is found in the cache.

9. The method of claim 1, further comprising:
receiving a new request for a new resource not stored in the cache;
retrieving the generated dependency graph;
determining a vertex in the dependency graph for the new resource;
determining a type of resource and dependencies of the new resource based on the determined vertex;
generating a new entity tag comprising data identifying the dependencies of the new resource and the type of resource; and
storing the new resource and the entity tag in the cache.

10. A cache management apparatus comprising:
a memory storing a plurality of instructions; and
a processor for executing the plurality of instructions, which comprise:
analyzing a structure of a resource in a system which exposes resources to clients;
generating a dependency graph of objects linked to the resource based on the analyzed structure of the resource,
wherein the generated dependency graph comprises hierarchical dependency information with respect to the objects linked to the resource;
receiving a request for a new resource not stored in a cache associated with the system;
determining a vertex in the dependency graph for the new resource;
determining a type of resource and dependencies of the new resource based on the determined vertex;
generating a new entity tag comprising data identifying the dependencies of the new resource and the type of resource; and
storing the new resource and the new entity tag in the cache.

11. The apparatus of claim 10, wherein the instructions for generating the dependency graph are based on structural dependencies between resources identified in a data representation language and wherein the dependency graph comprises vertices and edges.

12. The apparatus of claim 11, wherein each of the vertices comprises an identifier of a node and a list of other vertices that are linked to the node and wherein each of the other vertices are represented by a resource locator.

13. The apparatus of claim 11, wherein the dependency graph is generated at system boot time and wherein the dependency graph is in an extensible markup language (XML) format.

14. The apparatus of claim 10, wherein storing the new resource in the cache comprises determining a type of the data, which is one of a static data type, a stable data type, or a dynamic data type and wherein a time to live value for caching the data is assigned based on the determined type of data.

15. The apparatus of claim 10, wherein the dependency graph comprises entity tags and respective resource identifiers for each vertex on the dependency graph.

16. The apparatus of claim 10, wherein the plurality of instructions further comprise:
receiving a request to delete or modify the resource; and
upon making a determination that the resource is stored in the cache associated:
locating the vertex in the dependency graph for the resource based on the entity tag for the resource retrieved from an entity tag mapping table;
identifying a sub-graph based on the vertex in the dependency graph; and
removing the resource and related resources from the cache based on the identified sub-graph.

17. The apparatus of claim 16, wherein the instructions for removing the resources and the related resources from the cache comprise:
removing the resource from the cache,
determining one or more next levels in the identified sub-graph;
searching the cache for a node of the one or more next levels; and
removing the node when the node is found in the cache.

18. A non-transitory computer readable recording medium storing a plurality of computer-executable instructions comprising:
analyzing a structure of a resource in a system which exposes resources to clients;
generating a dependency graph of objects linked to the resource based on the analyzed structure of the resource, wherein the generated dependency graph comprises hierarchical dependency information with respect to the objects linked to the resource;
receiving a request to delete or modify the resource; and
upon making a determination that the resource is stored in a cache associated with the system:
locating a vertex in the dependency graph for the resource based on an entity tag for the resource retrieved from an entity tag mapping table;
identifying a sub-graph based on the vertex in the dependency graph; and
removing the resource and related resources from the cache based on the identified sub-graph.

* * * * *